United States Patent
Wada

(10) Patent No.: US 7,596,066 B2
(45) Date of Patent: Sep. 29, 2009

(54) OPTICAL DISC APPARATUS HAVING CONSTANT VOLTAGE CONTROL OF A SPINDLE MOTOR

(75) Inventor: Kozo Wada, Daito (JP)

(73) Assignee: Funai Electric Co., Ltd., Daito-shi ( * ) Notice: Subject to any disclaimer, the term of this patent is extended or adjusted under 35 U.S.C. 154(b) by 588 days.

(21) Appl. No.: 11/300,402

(22) Filed: Dec. 15, 2005

(65) Prior Publication Data

US 2006/0126461 A1 Jun. 15, 2006

(30) Foreign Application Priority Data

Dec. 15, 2004 (JP) .............................. 2004-362939

(51) Int. Cl.
G11B 5/09 (2006.01)
G11B 20/12 (2006.01)
(52) U.S. Cl. ................. 369/52.1; 369/59.25; 369/47.47
(58) Field of Classification Search ........................ None
See application file for complete search history.

(56) References Cited

U.S. PATENT DOCUMENTS

| 6,034,934 | A | 3/2000 | Miyake et al. | |
| 6,266,299 | B1 * | 7/2001 | Oshima et al. | 369/13.38 |
| 6,618,333 | B1 * | 9/2003 | Chou et al. | 369/47.36 |
| 2004/0001405 | A1 * | 1/2004 | Yen | 369/47.35 |
| 2006/0092799 | A1 * | 5/2006 | Lee et al. | 369/53.22 |

FOREIGN PATENT DOCUMENTS

| JP | 08-287590 A | 11/1996 |
| JP | 10-228646 | 8/1998 |
| JP | 10-228713 A | 8/1998 |
| JP | 11-073648 A | 3/1999 |
| JP | 11-213542 A | 8/1999 |
| JP | 2000-82256 A | 3/2000 |
| JP | 2000-251389 A | 9/2000 |
| JP | 2001-325769 A | 11/2001 |

OTHER PUBLICATIONS

Japanese Office Action dated Jun. 11, 2007 with English translation (eight (8) pages).
Japanese Office Action dated Nov. 13, 2007 with English translation (Nine (9) pp.).

* cited by examiner

*Primary Examiner*—Peter Vincent Agustin
(74) *Attorney, Agent, or Firm*—Crowell & Moring LLP

(57) ABSTRACT

An optical disc apparatus allows an optical pickup to seek to a physical address 30000Hex, and controls high-speed CLV of a spindle motor to be 1.04-multiple speed of CLV so as to set rotational speed of the spindle motor at 1440 rpm, before reproducing information from NBCA. The optical disc apparatus acquires spindle output for the spindle motor during the CLV control, and calculates an average value of the acquired spindle output, and further stores the calculated average value. When reproducing the information of NBCA, the optical disc apparatus controls the spindle output to be the average value of the spindle output so as to control the rotational speed of the spindle motor at 1440 rpm. This makes it possible for the optical disc apparatus to reproduce the information of NBCA without using an FG.

1 Claim, 8 Drawing Sheets

SPINDLE WAVEFORM

REFERENCE VOLTAGE 1.65V

DUTY RATIO OF SPINDLE OUTPUT

Prior Art

OPTICAL DISC APPARATUS HAVING CONSTANT VOLTAGE CONTROL OF A SPINDLE MOTOR

BACKGROUND OF THE INVENTION

1. Field of the Invention

The present invention relates to an optical disc apparatus.

2. Description of the Related Art

Technologies such as CPRM (Content Protection for Recordable Media) are known to protect copyrights of contents in recording media such as DVD (Digital Versatile Disc). Referring to FIG. 14, which is a schematic view showing an optical disc 2 for explaining a read-in area 21 and an NBCA (Narrow Burst Cutting Area) 22 on the optical disc 2, the CPRM technology uses information recorded in the NBCA 22 which is positioned at an inner circumference than the read-in area 21.

In order to reproduce the information recorded in the NBCA 22, it is necessary to rotate the optical disc 2 at a predetermined rotational speed (1440 rpm) while reproducing the information via an optical pickup. This reproduction of information from the NBCA 22 does not cause a problem in an optical disc apparatus with a CAV (Constant Angular Velocity) servo control system which enables accurate angular velocity control for information reproduction. However, the reproduction of information from the NBCA 22 causes a program in an optical disc apparatus with a CLV (Constant Linear Velocity) servo control system for information reproduction, such as a DVD-R/RW (Recordable/Rewritable) apparatus, as will be described below.

The information is recorded in the NBCA 22 by vaporizing a portion of a reflective surface of the optical disc 2, using e.g. a YAG (Yttrium Aluminum Garnet) laser. Accordingly, the CLV servo control system is not applicable to the NBCA 22. For this reason, an optical disc apparatus with a CLV servo control system for information reproduction is required to additionally have e.g. an FG (Frequency Generator) to accurately control the angular velocity of the disc 2. However, the addition of e.g. the FG to the CLV servo control system is not preferable, because it increases the size and cost of the optical disc apparatus.

Optical disc apparatus to enable reproduction of information from the NBCA without using an FG are known, such as Japanese Laid-open Patent Publications Hei 11-73648, Hei 10-228646, Hei 10-228713 and Hei 8-287590. One of the known apparatus once performs CLV servo control to rotate the optical disc 2 at a rotational speed adapted to the reproduction of the read-in area 21, and then turns off the CLV servo control, and further moves an optical pickup to the NBCA 22, so as to reproduce information of the NBCA 22. Another one of the known apparatus accelerates the rotation of a spindle motor for a predetermined period, and then switches the rotational state of the spindle motor to inertial rotation, so as to reproduce the information of the NBCA 22. Still another one of the known apparatus controls the acceleration operation of a spindle motor on the basis of synchronization signals contained in the NBCA 22, so as to reproduce information of the NBCA 22.

However, no optical disc apparatus is known, which can perform CLV servo control at a linear velocity corresponding to a predetermined rotational speed used for reproducing information of the NBCA 22 of the optical disc 2 so as to obtain a control parameter value for a spindle motor, and reproduce information of the NBCA 22 by maintaining the predetermined rotational speed on the basis of the thus obtained control parameter value for the spindle motor.

SUMMARY OF THE INVENTION

An object of the present invention is to provide such an optical disc apparatus that can read or reproduce information from an NBCA without using an FG.

According to the present invention, the object is achieved by an optical disc apparatus comprising: a spindle motor for rotating an optical disc; an optical pickup for irradiating a laser beam onto a recording surface of the optical disc, and for receiving reflection light from the optical disc so as to read information recorded on the optical disc; an NBCA (Narrow Burst Cutting Area) information reproduction control unit for controlling rotational speed of the spindle motor at a predetermined rotational speed for reproduction of information of NBCA on the optical disc, and for reproducing the information of NBCA based on the information read by the optical pickup; an output unit for outputting spindle output for rotation control to the spindle motor; a CLV (Constant Linear Velocity) control unit for outputting a CLV control signal to the output unit so as to subject the spindle motor to CLV control; a constant voltage control unit for outputting a constant voltage control signal to the output unit so as to subject the spindle motor to constant voltage control; and a control parameter value detection unit for subjecting the spindle motor to CLV control at a linear velocity, at a physical address of the optical disc, corresponding to the predetermined rotational speed for the reproduction of the information of NBCA on the optical disc, and for detecting a control parameter value for the spindle motor during the CLV control.

Therein, the NBCA information reproduction control unit subjects the spindle motor to the constant voltage control on the basis of the control parameter value when reproducing the information of NBCA, so as to control the rotational speed of the spindle motor at the predetermined rotational speed.

Preferably, the control parameter value is a value of the spindle output, a value of a counter electromotive voltage of the spindle motor, a value of a duty ratio of the spindle output, or a value of the CLV control signal.

Still preferably, the optical disc apparatus further comprises: a linear velocity calculation unit for calculating the linear velocity at the physical address of the optical disc which corresponds to the predetermined rotational speed for the reproduction of the information of NBCA on the optical disc; and an average value calculation unit for calculating an average value of the control parameter value detected by the control parameter value detection unit for one rotation of the optical disc. Therein, the control parameter value detection unit subjects the spindle motor to CLV control at the linear velocity calculated by the linear velocity calculation unit. Further, the NBCA information reproduction control unit subjects the spindle motor to the constant voltage control so as to control the control parameter value for the spindle motor to be the average value of the control parameter value, when reproducing the information of NBCA, so as to control the rotational speed of the spindle motor at the predetermined rotational speed.

According to the optical disc apparatus of the present invention, the spindle motor is subjected at a predetermined or arbitrary physical address of the optical disc to CLV control at a linear velocity of the optical disc corresponding to a predetermined rotational speed which is used to reproduce the information of NBCA on the optical disc. Under the CLV control, a control parameter value for the spindle motor is detected. When reading or reproducing information from the NBCA, the spindle motor is subjected to constant voltage control on the basis of the thus detected control parameter value, so as to control the rotational speed of the spindle motor to be the predetermined rotational speed. Accordingly, it is not necessary to use an FG for reading or reproducing the information from the NBCA, making it possible to omit e.g. a circuit for detecting the rotational speed of the spindle motor.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 5A is a graph showing a spindle waveform at the time of the control parameter value determination process, while

FIG. 12A is a graph showing a spindle waveform at the time of the control parameter value determination process, while

DESCRIPTION OF THE PREFERRED EMBODIMENTS

Figure 1:
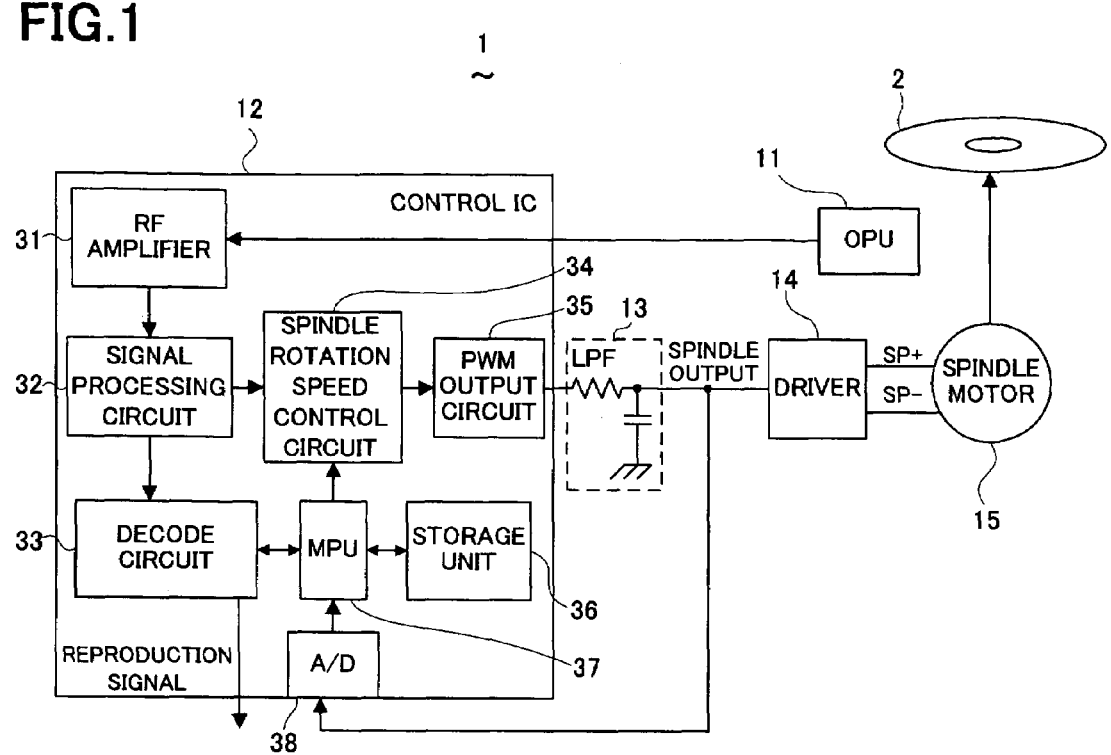
FIG. 1 is a schematic block diagram of an optical disc apparatus according to a first embodiment of the present invention.

The best modes and preferred embodiments of the present invention will be described hereinafter with reference to the annexed drawings. Note that the specific embodiments described are not intended to cover the entire scope of the present invention, and hence the present invention is not limited to only the specific embodiments. Also note that like parts are designated by like reference numerals throughout the drawings.

FIG. 1 is a schematic block diagram of an optical disc apparatus 1 according to a first embodiment of the present invention. As shown in FIG. 1, the optical disc apparatus 1 performs e.g. reproduction of information recorded on an optical disc 2 such as DVD, and comprises: an optical pickup 11; a control IC (Integrated Circuit) 12 for controlling reproduction of information recorded on the optical disc 2; a low-pass filter 13; a spindle motor 15 for rotating the optical disc 2; and a driver 14 for driving the spindle motor 15 on the basis of a spindle output signal, or simply spindle output, from the control IC 12.

The optical pickup 11 comprises a semiconductor laser, a collimating lens, a beam splitter, an objective lens, a collecting lens, a photodetector, and so on. Light emitted from the semiconductor layer is collected and irradiated onto a recording surface of the optical disc 2 through the collimating lens, the beam splitter and the objective lens. Reflection light reflected from the recording surface of the optical disc 2 is collected onto, and received by, the photodetector through the objective lens, the beam splitter and the collecting lens. The intensity of light received or detected by the photodetector is converted to an RF (Radio Frequency) signal, which is output to the control IC 12.

The control IC 12 comprises: an RF amplifier 31 for amplifying an RF signal; a signal processing circuit 32 for converting the RF signal to a digital signal, and subjecting the digital signal to 8/16 demodulation to obtain 8/16 demodulated signal, and further subjecting the 8/16 demodulated signal to error correction to obtain an error-corrected digital signal; a decode circuit 33 for decoding the error-corrected digital signal from the signal processing circuit 32 to a reproduction signal; a spindle rotation speed control circuit 34 for controlling the rotational speed of the spindle motor 15; a PWM (Pulse Width Modulation) output circuit ("output unit") 35 for outputting spindle output to subject the spindle motor 15 to PWM control; a storage unit 36 for storing various information; an MPU (microprocessor unit serving as an "NBCA information reproduction control unit", a "control parameter value detection unit" and an "average value calculation unit") 37; and an A/D (Analog-to-Digital) converter 38 for converting an analog signal input thereto to a digital signal, and outputting the thus obtained digital signal to the MPU 37.

Figure 2:
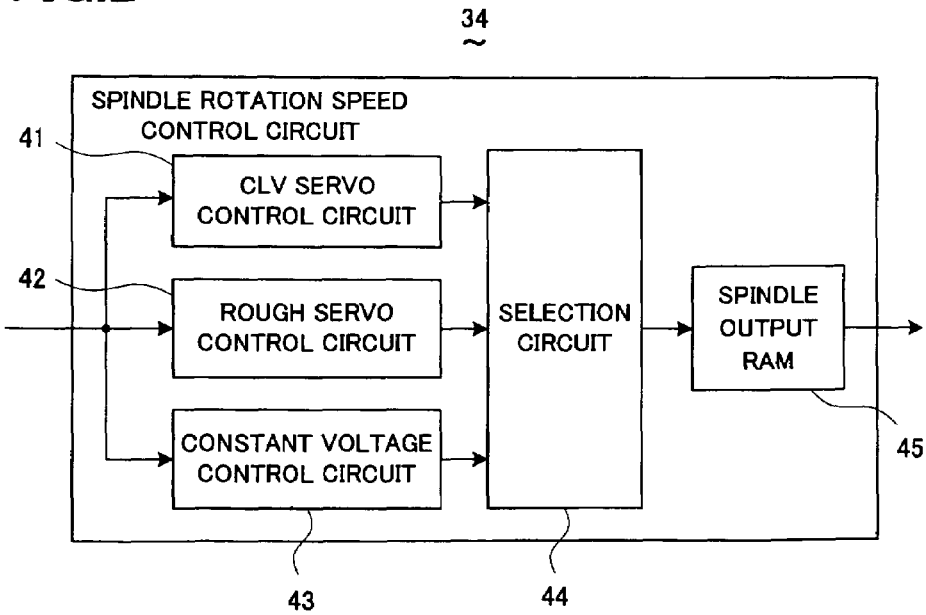
FIG. 2 is a schematic block diagram of an example of a spindle rotation speed control circuit in the optical disc apparatus.

FIG. 2 is a schematic block diagram of an example of the spindle rotation speed control circuit 34. As shown in FIG. 2, the spindle rotation speed control circuit 34 comprises: a CLV servo control circuit ("CLV control unit") 41 for outputting a CLV control signal to the PWM output circuit 35 so as to subject the spindle motor 15 to CLV control; a constant voltage control circuit ("constant voltage control unit") 43 for outputting a constant voltage control signal to the PWM output circuit 35 so as to subject the spindle motor 15 to constant voltage control; a rough servo control circuit 42 for outputting a control signal to the PWM output circuit 35 so as to control the rotational speed on the basis of a reference clock (refer to FIG. 3); a selection circuit 44 for selecting one of the control circuits 41 to 43 so as to output one of the control signals to the PWN output circuit 35; and a spindle output RAM (Random Access Memory) 45 for storing control values of the control signals (CLV control signals) from the control circuits 41 to 43 that are to be output as spindle output to the PWM output circuit 35.

Figure 3:
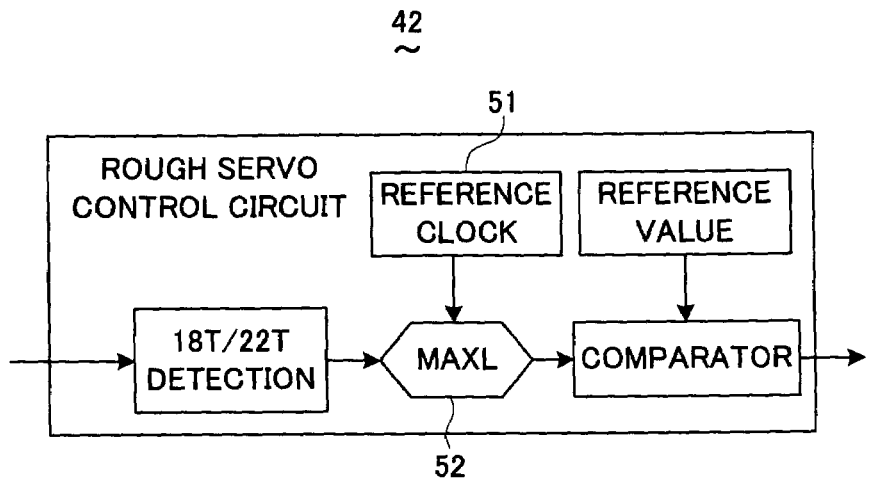
FIG. 3 is a schematic block diagram of an example of a rough servo control circuit in the spindle rotation speed control circuit.

Referring to FIG. 3, which is a schematic block diagram of an example of the rough servo control circuit 42, the rotational speed of the spindle motor 15 is detected by MAXL 52 on the basis of a reference clock 51 of the rough servo control circuit 42. Note that the MAXL 52 detects maximum length sync patterns of 14T+4T length for DVD and 11T+11T length for CD (Compact Disc) by 18T/22T detection, and holds data of these maximum length sync patterns counted by the reference clock 51. The rotational speed of the spindle motor 15 is detected on the basis of such data.

Figure 4:
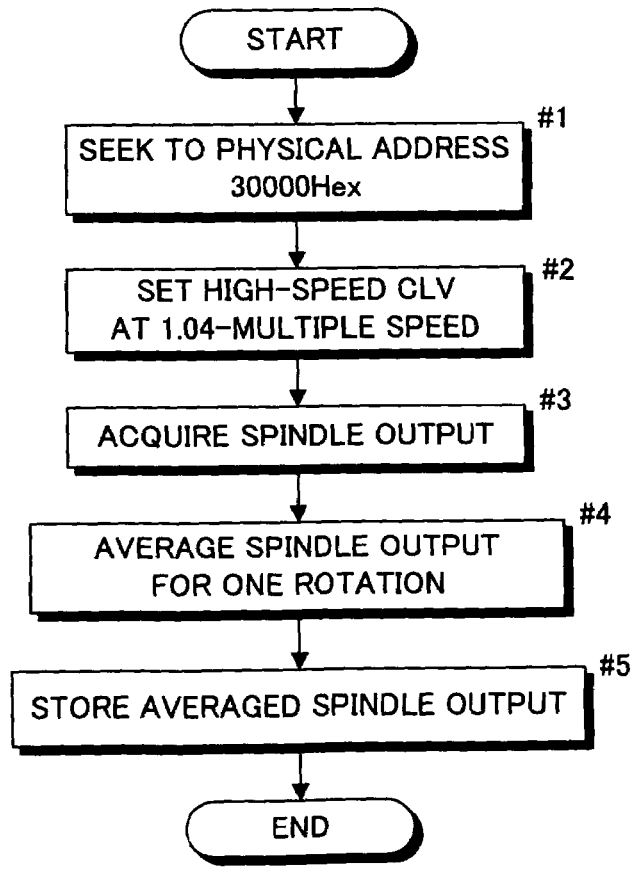
FIG. 4 is a flow chart showing a control parameter value determination process performed in the optical disc apparatus according to the first embodiment of the present invention.
Figure 14:
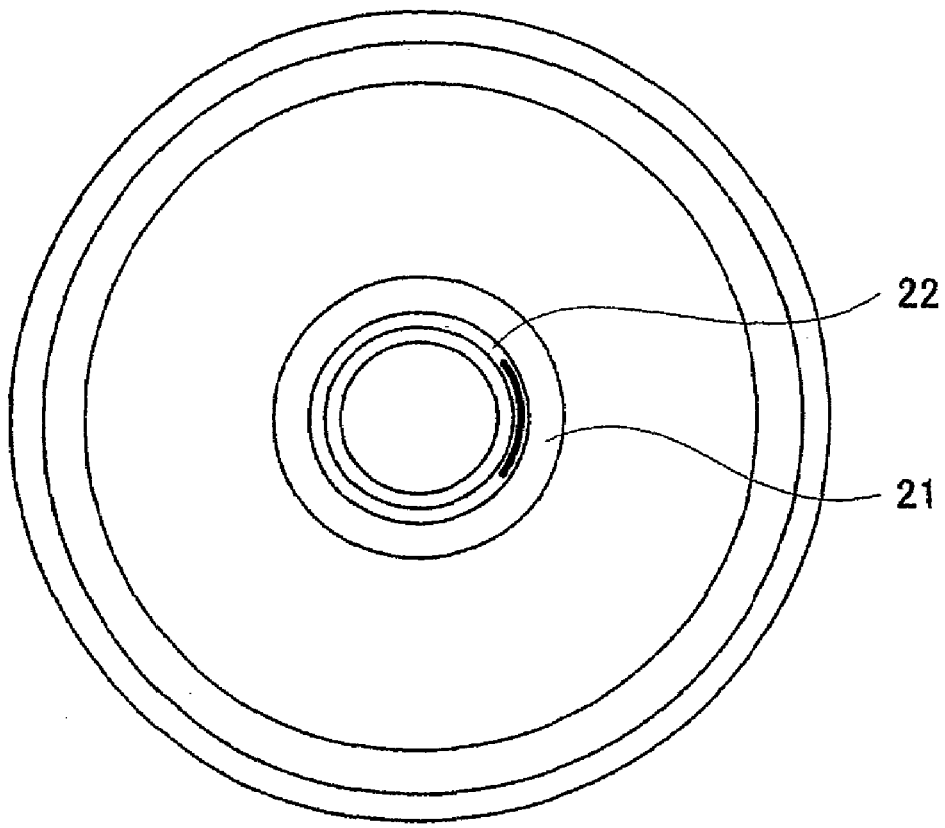
FIG. 14 is a schematic view showing an optical disc for explaining a read-in area and an NBCA in the optical disc.

Referring now to the flow chart of FIG. 4, the following describes a control parameter value determination process performed in the optical disc apparatus 1 of the present first embodiment for controlling the spindle motor 15 to rotate at e.g. 1440 rpm as a predetermined rotational speed when reproducing information of NBCA (Narrow Burst Cutting Area) 22 on an optical disc 2. In the present specification, the term "control parameter" is used to mean a signal (a characteristic signal) for the spindle motor 15 (more specifically which is applied to or detected from the spindle motor 15), and which is used to control the rotation of the spindle motor 15, while the term "control parameter value" is a value of the control parameter and is typically an average value of the control parameter as measured and calculated. As apparent from the description below, a feature of the present first embodiment is that spindle output is used as a control parameter. Note here that FIG. 14 as used above in the Description of the Related Art is used here as well for describing the NBCA 22 of the optical disc 2.

Referring to FIG. 4, when the control parameter value determination process starts, the MPU 37 allows the optical pickup 11 to seek to a physical address 30000Hex (#1), and subjects the spindle motor 15 to CLV control so as to set "x" value in "x" multiple of CLV for a high-speed CLV at 1.04 (so-called 1.04x) (#2). This "x" value of the high-speed CLV represents a linear velocity at physical address 30000Hex of the optical disc 2 corresponding to rotational speed 1440 rpm, which is used to reproduce information of the NBCA 22 of the optical disc 2. The MPU 37 calculates the x value in the high-speed CLV from Equation (1) below, using known quantities of radius 0.024 m at the physical address 30000Hex and linear velocity 3.48 m/s of the optical disc 2 at one-multiple of CLV. Note here that the physical address to seek to in the step #1 is not always required to be 30000Hex, and can be a further or arbitrary physical address as long as it is possible to set a high-speed CLV corresponding to the further or arbitrary physical address. (This note applies to later-described third to sixth embodiments of the present invention as well.)

$$x = \frac{1440 \times 2 \times \pi \times 0.024}{60 \times 3.48} \cong 1.04 \quad (1)$$

Figure 5A:
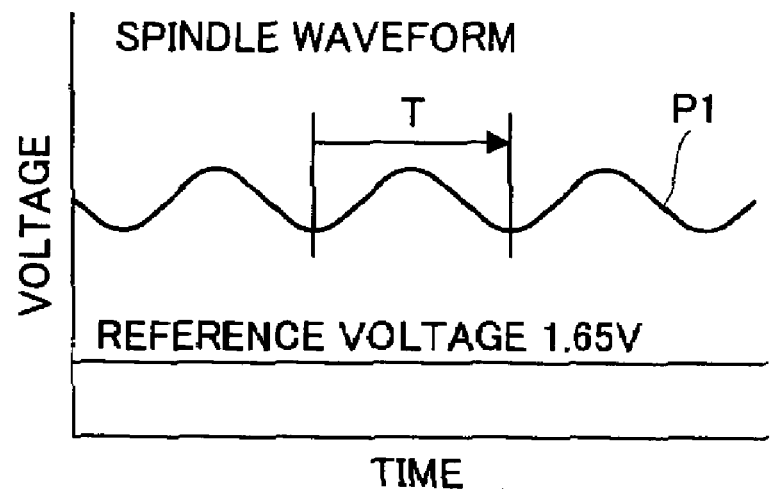
Figure 5B:
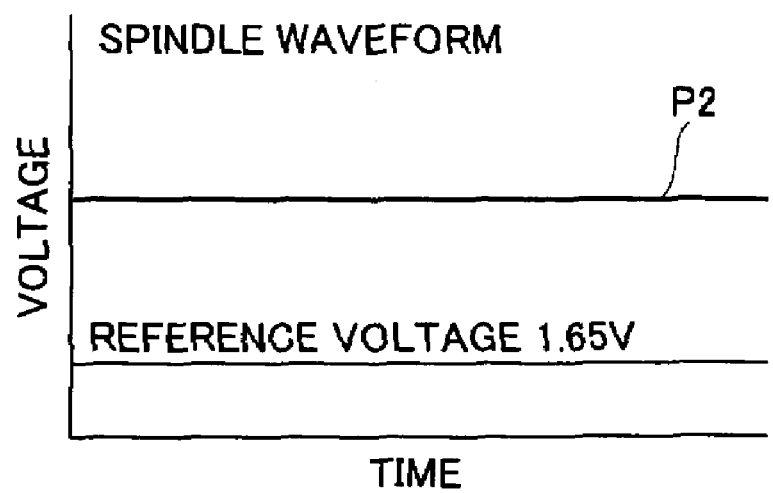
FIG. 5B is a graph showing a spindle waveform when reproducing information of NBCA.

After determining, using the MAXL 52, that "x" value in "x" multiple of CLV for the high-speed CLV becomes 1.04 (i.e. 1.04x), the MPU 37 acquires spindle output via the A/D converter 38 (#3), and calculates an average value of the spindle output for one rotation of the optical disc 2 (#4). FIG. 5A is a graph showing a waveform P1 of the spindle output (hereafter referred to as "spindle waveform") at the time of the control parameter value determination process, while FIG. 5B is a graph showing a spindle waveform P2 when reproducing the information of the NBCA. Referring to FIG. 5A, the MPU 37 calculates an average value of the spindle output for a period T (one rotation of optical disc 2) shown therein. The MPU 37 stores, in the storage unit 36, the average value of the spindle output as obtained by the calculation (#5), thereby ending the control parameter value determination process.

When reproducing the information of the NBCA 22, the MPU 37 subjects the spindle motor 15 to constant voltage control, using a spindle waveform P2 shown in FIG. 5B, so as to control the spindle output value for the spindle motor 15 to be the average value of the spindle output as determined by the control parameter value determination process described above, thereby controlling the rotational speed of the spindle motor 15 to be 1440 rpm.

As described in the foregoing, according to the optical disc apparatus 1 of the present first embodiment, the spindle motor 15 is subjected at a predetermined physical address of the optical disc 2 to CLV control at a linear velocity of the optical disc 2 corresponding to 1440 rpm which is used to reproduce information of the NBCA 22 of the optical disc 2. Under the CLV control, a spindle output value (i.e. control parameter value) for the spindle motor 15, or more specifically applied to the spindle motor 15, is detected. When reading or reproducing information from the NBCA 22, the spindle motor 15 is subjected to constant voltage control on the basis of the thus detected or acquired spindle output value (control parameter value), so as to control the rotational speed of the spindle motor to be 1440 rpm. Accordingly, it is not necessary to use an FG for reading or reproducing the information from the NBCA 22, making it possible to omit e.g. a circuit for detecting the rotational speed of the spindle motor 15.

Next, an optical disc apparatus 1 according to a second embodiment of the present invention will be described. The optical disc apparatus 1 of the present second embodiment is basically the same as that of the first embodiment and can be shown by the schematic block diagram of FIG. 1, except that the control parameter value (spindle output value) is determined without the seeking to a predetermined physical address (e.g. 30000Hex) of the optical disc 2. Note that the MPU 37 in the present second embodiment serves also as a "linear velocity calculation unit".

Figure 6:
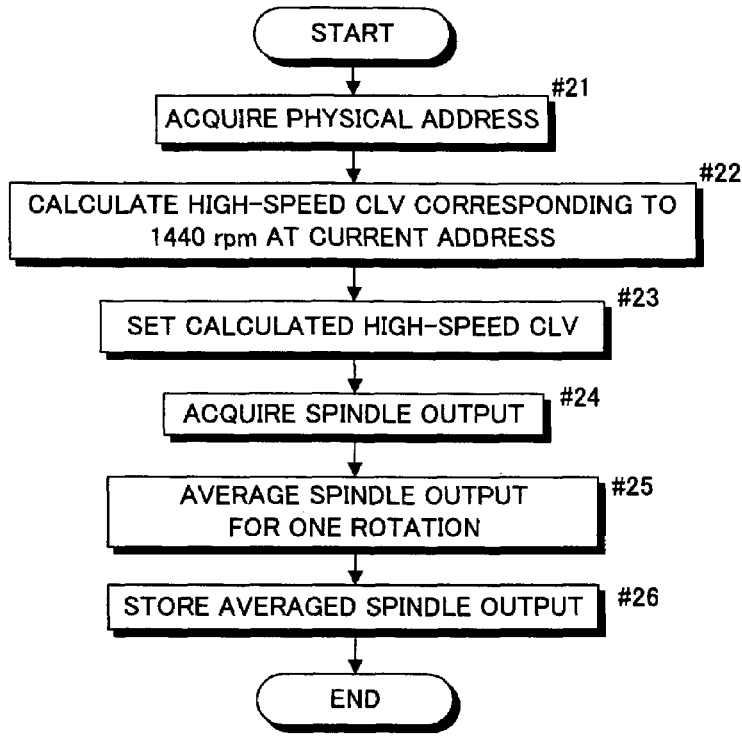
FIG. 6 is a flow chart showing a control parameter value determination process performed in an optical disc apparatus according to a second embodiment of the present invention.

Referring to the flow chart of FIG. 6, the following describes a control parameter value determination process performed in the optical disc apparatus 1 of the present second embodiment. When the control parameter value determination process starts, the MPU 37 acquires a physical address Add A under reproduction (such physical address being hereafter referred to as "current address") (#21). From Equation (2) below, the MPU 37 calculates "x" value in "x" multiple of CLV for the high-speed CLV corresponding to 1440 rpm at the current address Add A, using known quantities of physical sector length 5.1584 mm, track pitch 0.74 μm, radius 0.024 ml at the physical address 30000Hex and linear velocity 3.48 m/s of the optical disc 2 at one-multiple of CLV (#22). The MPU 34 sets the rotational speed of the spindle motor 15 at the high-speed CLV with the "x" multiple of CLV as obtained by the calculation in the step #22 (#23).

$$x = \frac{1440 \times 2 \times \pi \times \sqrt{\frac{(a - 30000) \times 5.1584 \times 10^{-3} \times 0.74 \times 10^{-6}}{\pi} + 0.024^2}}{60 \times 3.48} \quad (2)$$

After determining, using the MAXL 52, that the high-speed CLV speed becomes the "x" multiple of CLV, the MPU 37 acquires spindle output via the A/D converter 38 (#24), and calculates an average value of the spindle output for one rotation of the optical disc 2 (#25). The MPU 37 stores, in the storage unit 36, the average value of the spindle output as obtained by the calculation (#26), thereby ending the control parameter value determination process.

When reproducing the information of the NBCA 22, the MPU 37 subjects the spindle motor 15 to constant voltage control, so as to control the spindle output value to be the average value of the spindle output as determined by the control parameter value determination process described above, thereby controlling the rotational speed of the spindle motor 15 to be 1440 rpm. The optical disc apparatus 1 according to the present second embodiment has an advantage or effect similar to that according to the first embodiment, and in addition, an advantage that the control parameter value (spindle output value) for the spindle motor 15, or more specifically applied to the spindle motor 15, can be determined without the seeking to a predetermined physical address (e.g. 30000Hex) of the optical disc 2.

Next, an optical disc apparatus 1 according to a third embodiment of the present invention will be described. The optical disc apparatus 1 of the present third embodiment is basically similar to that of the first and the second embodiment, except that the control parameter value used for reproducing information of the NBCA 22 is counter electromotive voltage of the spindle motor 15.

Figure 7:
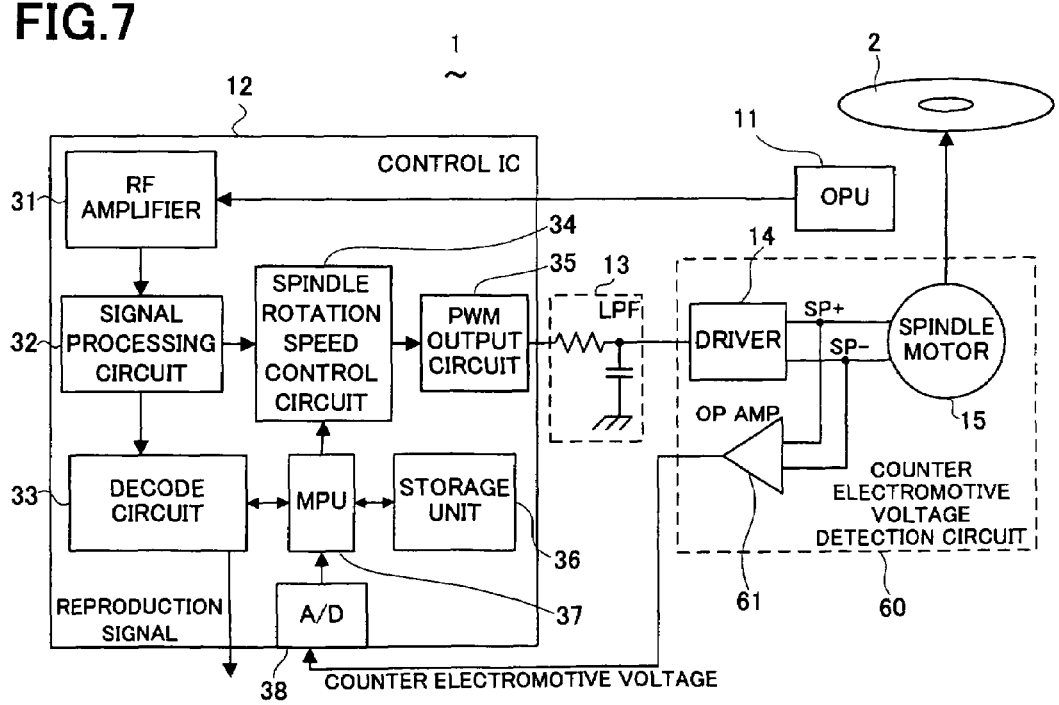
FIG. 7 is a schematic block diagram of an optical disc apparatus according to a third embodiment of the present invention.

Referring to FIG. 7, which is a schematic block diagram of an optical disc apparatus 1 according to the third embodiment of the present invention, the optical disc apparatus 1 comprises a counter electromotive voltage detection circuit 60 which is formed of an operational amplifier 61 along with a driver 14 and a spindle motor 15. Referring to the flow chart of FIG. 8, the following describes a control parameter value determination process performed in the optical disc apparatus 1 of the present third embodiment.

Figure 8:
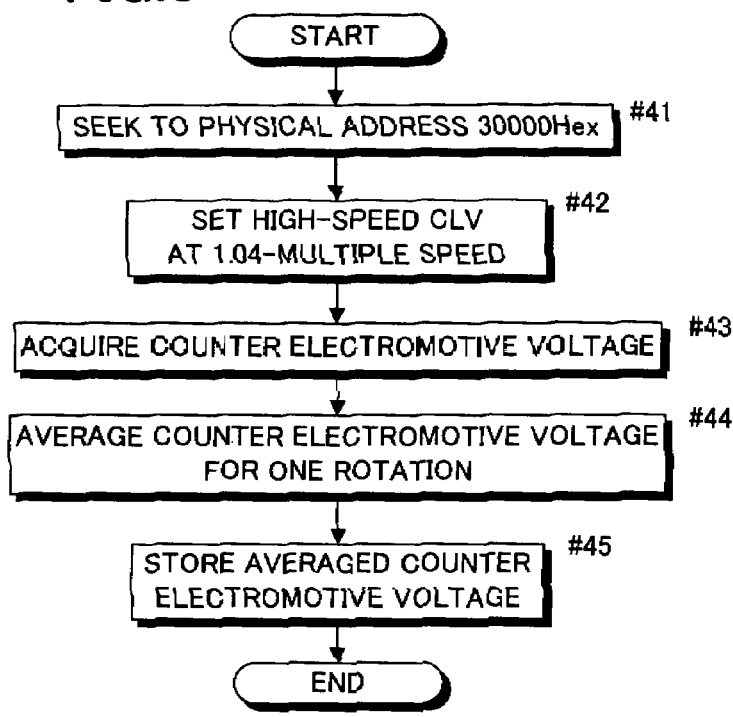
FIG. 8 is a flow chart showing a control parameter value determination process performed in the optical disc apparatus according to the third embodiment of the present invention.

Referring to FIG. 8, when the control parameter value determination process starts, the MPU 37 allows the optical pickup 11 to seek to a physical address 30000Hex (#41), and subjects the spindle motor 15 to CLV control so as to set "x" value in "x" multiple of CLV for a high-speed CLV at 1.04 (1.04x) (#42). After determining, using the MAXL 52, that "x" value in "x" multiple of CLV for the high-speed CLV becomes 1.04 (i.e. 1.04x), the MPU 37 acquires a counter electromotive voltage of the spindle motor 15 via the A/D converter 38 (#43), and calculates an average value of the counter electromotive voltage for one rotation of the optical disc 2 (#44). The MPU 37 stores, in the storage unit 36, the average value of the counter electromotive voltage as obtained by the calculation (#45), thereby ending the control parameter value determination process.

When reproducing the information of the NBCA 22, the MPU 37 subjects the spindle motor 15 to constant voltage control, so as to control the counter electromotive voltage to be the average value of the counter electromotive voltage as determined by the control parameter value determination process described above, thereby controlling the rotational speed of the spindle motor 15 to be 1440 rpm. Similarly as in the optical disc apparatus 1 according to the first embodiment, the optical disc apparatus 1 according to the present third embodiment makes it possible to read or reproduce the information from the NBCA 22 without using an FG.

Next, an optical disc apparatus 1 according to a fourth embodiment of the present invention will be described. The optical disc apparatus 1 of the present fourth embodiment is basically the same as that of the third embodiment and can be shown by the schematic block diagram of FIG. 7, except that the control parameter value is determined here in the control parameter value determination process without changing the CLV speed used during reproduction. Referring to the flow chart of FIG. 9, the following describes a control parameter value determination process performed in the optical disc apparatus 1 of the present fourth embodiment.

Figure 9:
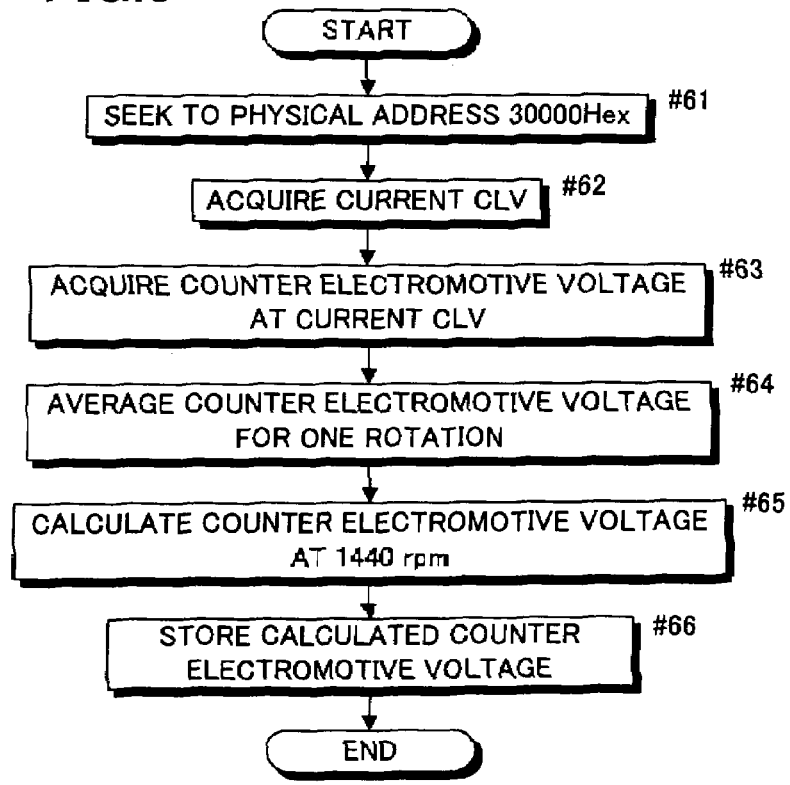
FIG. 9 is a flow chart showing a control parameter value determination process performed in an optical disc apparatus according to a fourth embodiment of the present invention.

Referring to FIG. 9, when the control parameter value determination process starts, the MPU 37 allows the optical pickup 11 to seek to a physical address 30000Hex (#61), and acquires a current CLV, more specifically acquires "$x_p$" value in "$x_p$" multiple of CLV for the current high-speed CLV (#62). Further, the MPU 37 acquires a counter electromotive voltage of the spindle motor 15 via the A/D converter 38 at the current high-speed CLV with the "$x_p$" multiple of CLV (#63), and calculates an average value $v_p$ of the counter electromotive voltage for one rotation of the optical disc 2 (#64).

From Equation (3) below, the MPU 37 calculates rotational speed $r_p$ at the physical address 30000Hex and at the current high-speed CLV with the "$x_p$" multiple of CLV, using known quantities of radius 0.024 m at the physical address 30000Hex and linear velocity 3.48 m/s of the optical disc 2 at one-multiple of CLV (#22). If "$x_p$" in the "$x_p$" multiple of CLV for the current high-speed CLV is 1.5 (i.e. 1.5x), for example, the rotational speed $r_p$ is 2077 rpm.

$$r_p = \frac{60 \times 3.48 \times x_p}{2 \times \pi \times 0.024} \tag{3}$$

Equation (4) below gives an average value v of the counter electromotive voltage at the rotational speed 1440 rpm of the spindle motor 15, based on the relation between the rotational speed and the counter electromotive of the spindle motor that is given by a linear expression. The MPU 37 calculates the average value v from Equation (4) (#65), and stores, in the storage unit 36, the average value v of the counter electromotive voltage as obtained by the calculation (#66), thereby ending the control parameter value determination process.

$$v = \frac{v_p \times 1440}{r_p} \tag{4}$$

When reproducing the information of the NBCA 22, the MPU 37 subjects the spindle motor 15 to constant voltage control, so as to control the counter electromotive voltage to be the average value v of the counter electromotive voltage as determined by the control parameter value determination process described above, thereby controlling the rotational speed of the spindle motor 15 to be 1440 rpm. The optical disc apparatus 1 according to the present fourth embodiment has an advantage or effect similar to that according to the third embodiment, and in addition, an advantage that the control parameter value (counter electromotive voltage value) for the spindle motor 15, or more specifically detected from the spindle motor 15, can be determined at an optional CLV speed.

Figure 10:
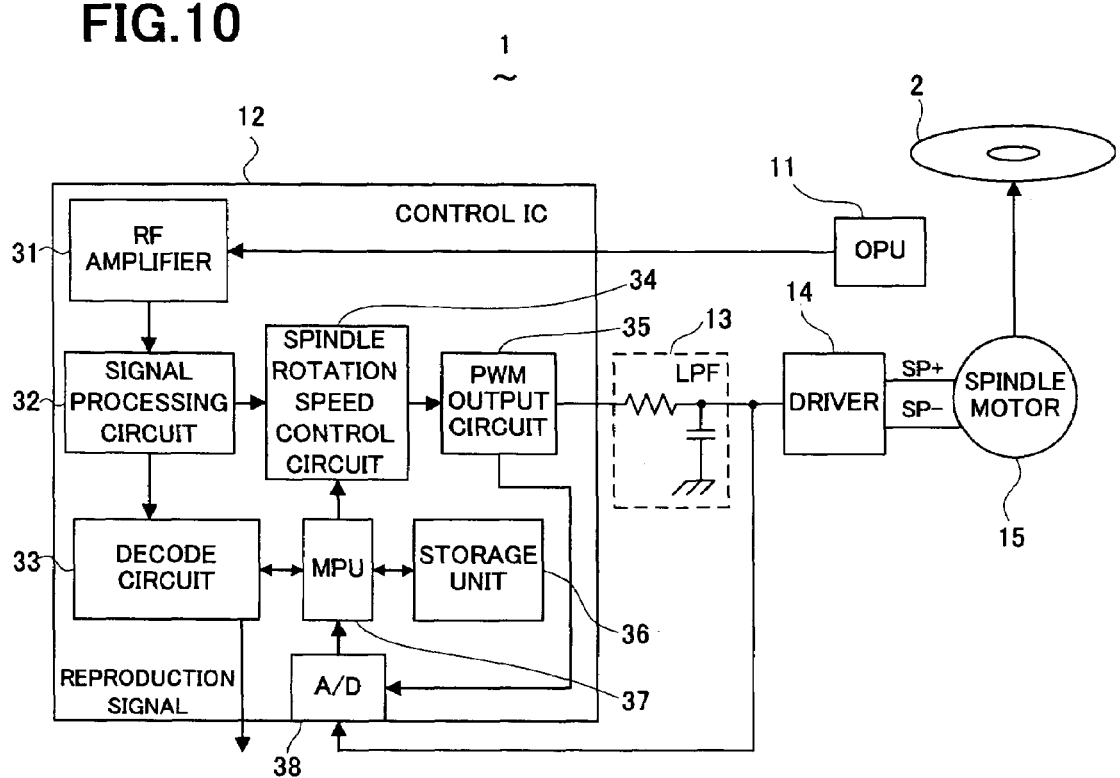
FIG. 10 is a schematic block diagram of an optical disc apparatus according to a fifth embodiment of the present invention.

Next, an optical disc apparatus 1 according to a fifth embodiment of the present invention will be described. The optical disc apparatus 1 of the present fifth embodiment is basically similar to that of the preceding embodiments such as the first and third embodiments, except that the control parameter value used for reproducing information of the NBCA 22 is duty ratio of spindle output. FIG. 10 is a schematic block diagram of an optical disc apparatus 1 according to the fifth embodiment of the present invention, and is the same as the schematic block diagram shown in FIG. 1, except that the spindle output from the PWM output circuit 35 is also sent to the A/D converter 38 so that the spindle output is converted thereby, and the thus converted signal is input to the MPU 37. Referring to the flow chart of FIG. 11, the following describes a control parameter value determination process performed in the optical disc apparatus 1 of the present fifth embodiment.

Figure 11:
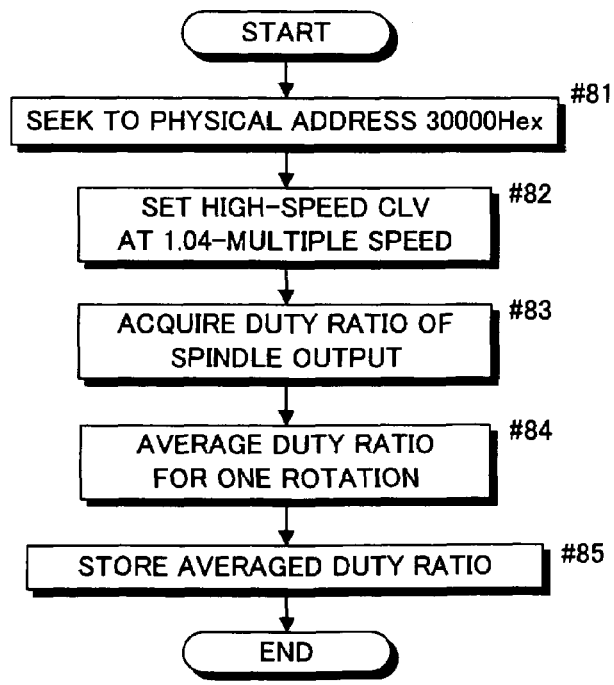
FIG. 11 is a flow chart showing a control parameter value determination process performed in an optical disc apparatus according to a fifth embodiment of the present invention.
Figure 12A:
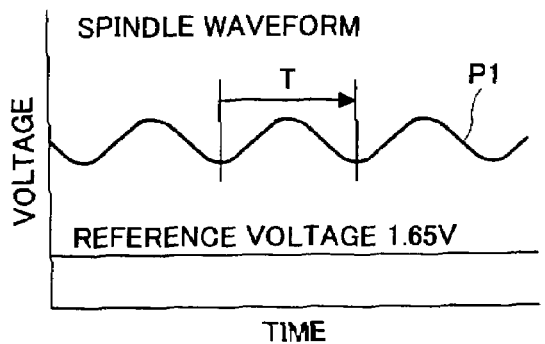
Figure 12B:
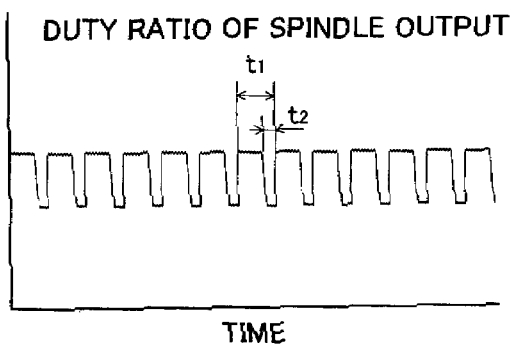
FIG. 12B is a graph showing duty ratios of spindle output.

Referring to FIG. 11, when the control parameter value determination process starts, the MPU 37 allows the optical pickup 11 to seek to a physical address 30000Hex (#81), and subjects the spindle motor 15 to CLV control so as to set "x" value in "x" multiple of CLV for a high-speed CLV at 1.04 (1.04x) (#82). FIG. 12A is a graph showing a spindle waveform at the time of the control parameter value determination process, while FIG. 12B is a graph showing duty ratios of spindle output. After determining, using the MAXL 52, that "x" value in "x" multiple of CLV for the high-speed CLV becomes 1.04 (i.e. 1.04x), the MPU 37 acquires duty ratios of spindle output each expressed as $t_1/t_2$ by using $t_1$ and $t_2$ shown in FIG. 12B (#83), and calculates an average value of the duty ratios of spindle output for one rotation of the optical disc 2, namely a period shown by T in FIG. 12A (#84). The MPU 37 stores, in the storage unit 36, the average value of the duty ratio of spindle output as obtained by the calculation (#85), thereby ending the control parameter value determination process.

When reproducing the information of the NBCA 22, the MPU 37 subjects the spindle motor 15 to constant voltage control, so as to control the duty ratio of spindle output to be the average value of the duty ratio of spindle output as determined by the control parameter value determination process described above, thereby controlling the rotational speed of the spindle motor 15 to be 1440 rpm. Similarly as in the optical disc apparatus 1 according to e.g. the first embodiment, the optical disc apparatus 1 according to the present fifth embodiment makes it possible to read or reproduce the information from the NBCA 22 without using an FG.

Next, an optical disc apparatus 1 according to a sixth embodiment of the present invention will be described. The optical disc apparatus 1 of the present sixth embodiment is basically similar to that of the preceding embodiments such as the first, third and fifth embodiments and can be shown by the schematic block diagram of FIG. 1, except that the control parameter value used for reproducing information of the NBCA 22 is CLV control signal. Referring to the flow chart of FIG. 13, the following describes a control parameter value determination process performed in the optical disc apparatus 1 of the present sixth embodiment.

Figure 13:
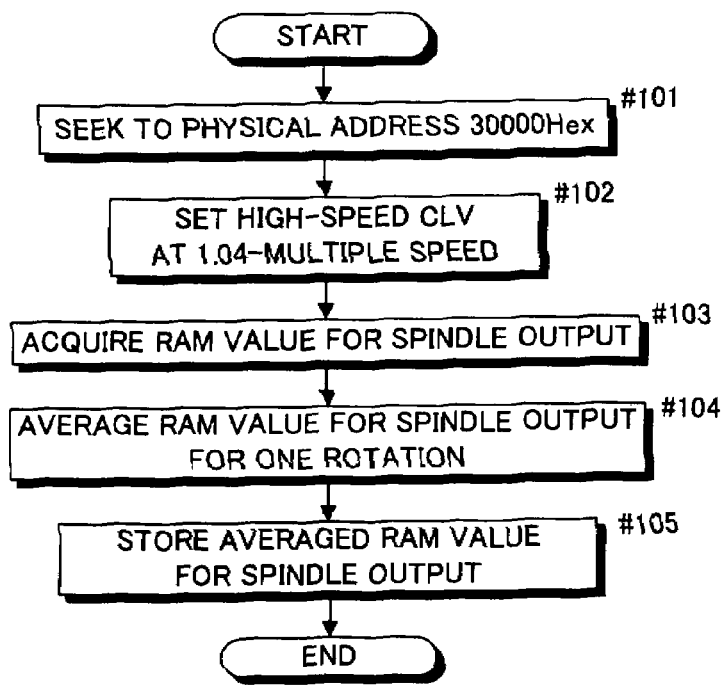
FIG. 13 is a flow chart showing a control parameter value determination process performed in an optical disc apparatus according to a sixth embodiment of the present invention.

Referring to FIG. 13, when the control parameter value determination process starts, the MPU 37 allows the optical pickup 11 to seek to a physical address 30000Hex (#101), and subjects the spindle motor 15 to CLV control so as to set "x" value in "x" multiple of CLV for a high-speed CLV at 1.04 (1.04x) (#102). After determining, using the MAXL 52, that "x" value in "x" multiple of CLV for the high-speed CLV becomes 1.04 (i.e. 1.04x), the MPU 37 acquires control values of the CLV control signals as stored in the spindle output RAM 45 (such control values being hereafter referred to as "spindle output RAM values") (#103), and calculates an average value of the spindle output RAM values for one rotation of the optical disc 2 (#104). The MPU 37 stores, in the storage unit 36, the average value of the spindle output RAM value as obtained by the calculation (#105), thereby ending the control parameter value determination process.

When reproducing the information of the NBCA 22, the MPU 37 subjects the spindle motor 15 to constant voltage control, so as to control the spindle output. RAM value to be the average value of the spindle output RAM value as determined by the control parameter value determination process described above, thereby controlling the rotational speed of the spindle motor 15 to be 1440 rpm. Similarly as in the optical disc apparatus 1 according to e.g. the first embodiment, the optical disc apparatus 1 according to the present sixth embodiment makes it possible to read or reproduce the information from the NBCA 22 without using an FG.

It is to be noted that the present invention is not limited to the above described embodiments, and various modifications are possible. For example, for controlling the rotation of the spindle motor 15, rotation control methods other than the PWM control can be used. In addition, although each control parameter value is averaged in each embodiment so as to use the averaged control parameter value for the rotational speed control of the spindle motor, other values than the averaged control parameter value can also be used.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. An optical disc apparatus, comprising:
    a spindle motor for rotating an optical disc;
    an optical pickup for irradiating a laser beam onto a recording surface of the optical disc, and for receiving reflection light from the optical disc so as to read information recorded on the optical disc;
    a Narrow Burst Cutting Area (NBCA) information reproduction control unit for controlling rotational speed of the spindle motor at a predetermined rotational speed for reproduction of information of NBCA on the optical disc, and for reproducing the information of NBCA based on the information read by the optical pickup;
    an output unit for outputting spindle output for rotation control to the spindle motor;
    a Constant Linear Velocity (CLV) control unit for outputting a CLV control signal to the output unit so as to subject the spindle motor to CLV control;
    a constant voltage control unit for outputting a constant voltage control signal to the output unit so as to subject the spindle motor to constant voltage control; and
    a control parameter value detection unit for subjecting the spindle motor to CLV control at a linear velocity, at a physical address of the optical disc, corresponding to the predetermined rotational speed for the reproduction of the information of NBCA on the optical disc, and for detecting a control parameter value for the spindle motor during the CLV control;
    a linear velocity calculation unit for calculating the linear velocity at the physical address of the optical disc which corresponds to the predetermined rotational speed for the reproduction of the information of NBCA on the optical disc; and
    an average value calculation unit for calculating an average value of the control parameter value detected by the control parameter value detection unit for one rotation of the optical disc,
    wherein: the NBCA information reproduction control unit subjects the spindle motor to the constant voltage control on the basis of the control parameter value when reproducing the information of NBCA, so as to control the rotational speed of the spindle motor at the predetermined rotational speed,
    the control parameter value is a value of the spindle output, a value of a counter electromotive voltage of the spindle motor, a value of a duty ratio of the spindle output, or a value of the CLV control signal;

the control parameter value detection unit subjects the spindle motor to CLV control at the linear velocity calculated by the linear velocity calculation unit; and the NBCA information reproduction control unit subjects the spindle motor to the constant voltage control so as to control the control parameter value for the spindle motor to be the average value of the control parameter value, when reproducing the information of NBCA, so as to control the rotational speed of the spindle motor at the predetermined rotational speed.

* * * * *